Feb. 16, 1932.    A. C. PETERSON    1,845,556
MULTIPOWERED AEROPLANE
Filed May 1, 1929    2 Sheets-Sheet 2

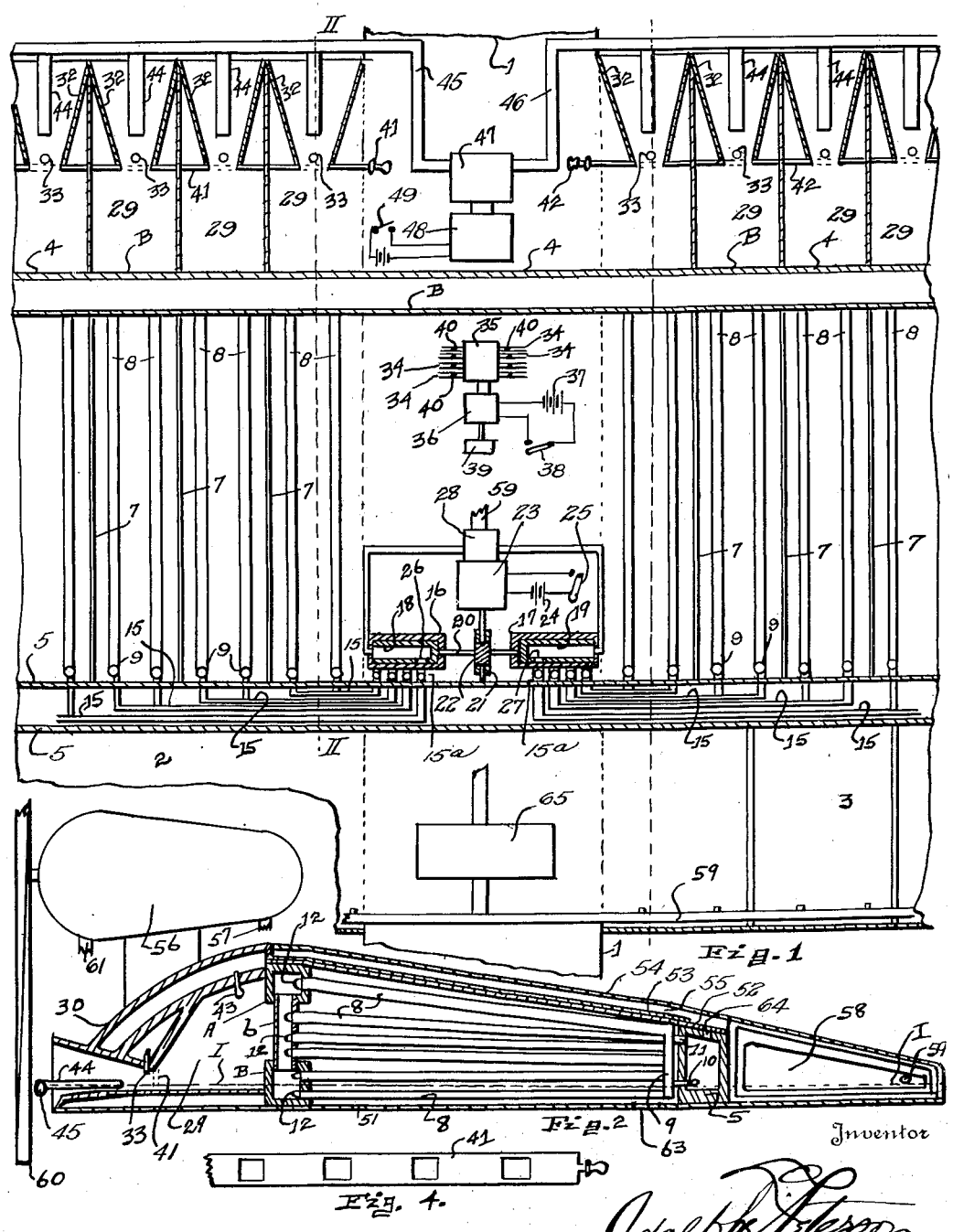

Inventor
Adolphe Peterson

Patented Feb. 16, 1932

1,845,556

UNITED STATES PATENT OFFICE

ADOLPHE C. PETERSON, OF MINNEAPOLIS, MINNESOTA

MULTIPOWERED AEROPLANE

Application filed May 1, 1929. Serial No. 359,678.

My invention relates to power devices particularly as applied to aeroplane and is therefore called a multi-powered aeroplane. The principal objects of my invention are to provide a form of power plant which is applied to aeroplanes and is particularly adapted therefor. A principal object is to provide a form of aeroplane which has inherently constructed with it a power plant, the form of construction being such that the inherent strength of the parts of the aeroplane as the wings is utilized not only for the constructional parts of the aeroplane wings but is utilized also to form parts of the power plant and therefore performs a double function and to that extent lessens the weight of the aeroplane with its power plant. A particular object of the device is to provide a form of steam power plant which has certain features which particularly adapt it to the use where weight is a consideration. A particular object of the device is to provide a form of steam power plant which has certain features which particularly adapt it to the use where multiple unit construction is desired for reliability in performance. A particular object is to provide a form of power plant which is particularly adapted to the aeroplane because of its reliability, and which because of the form of its adaptation in the aeroplane is particularly adapted thereto.

The principal devices and combinations of devices comprising my invention are as hereinafter described and as defined in the claims. In the accompanying drawings which illustrate my invention like characters refer to like parts throughout the several views.

Referring to the drawings:

Figure 1 is a view partly in plan view and principally in horizontal section through the principal operating parts of my device, the horizontal section being on the line I—I of Figure 2.

Figure 2 is a vertical section on the line II—II of Figure 1, this section being a section through one of the generation units of one wing, other generation units in that wing and in the other wing being substantially similar.

Figure 4 is a detail view of one of the valves.

Figure 3:
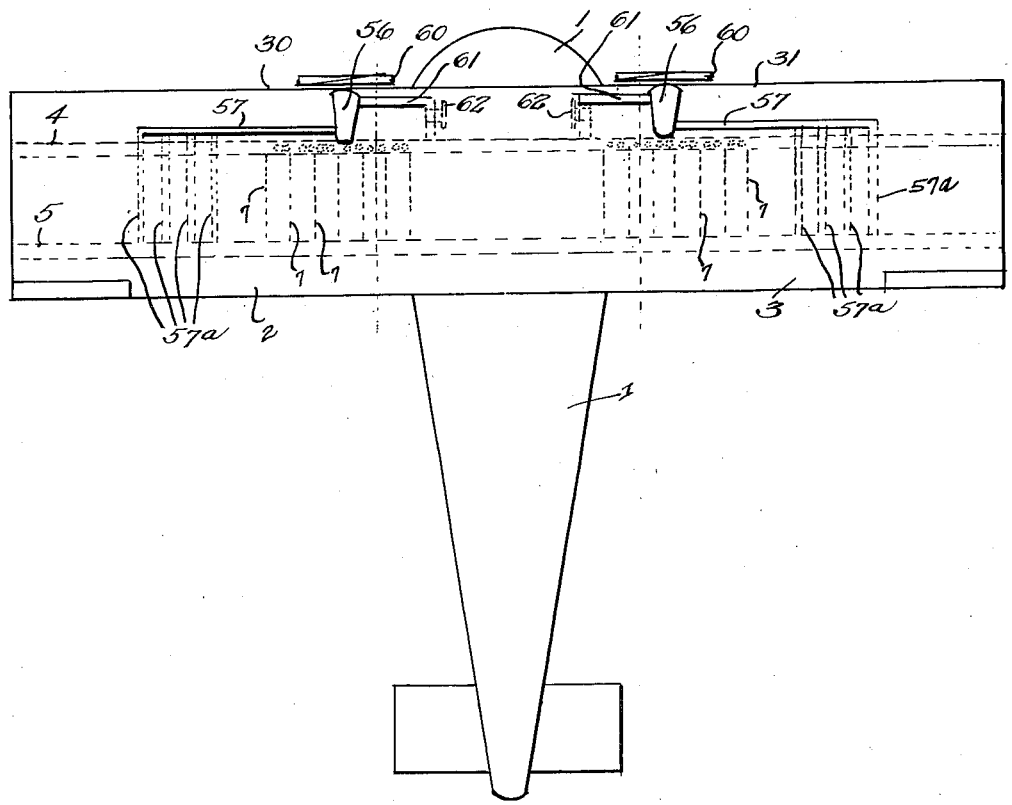
Figure 3 is a plan view of the aeroplane embodying the device upon a somewhat reduced scale.

Referring again to the drawings, the numeral 1 indicates a fuselage to which the parts are related, this fuselage being of the usual type or any type, and being only partly shown in the drawings Figure 1. The wings of the aeroplane are located in the usual position relative to the fuselage 1 and these wings 2 and 3 are formed preferably upon one transverse spar or beam 4 and another transverse spar or beam 5 as a basis. There may be separate spars in similar positions for each wing but they are preferably formed as one spar 4 near the forward edge and one spar 5 near the rear edge of the wings, these spars passing transversely through the fuselage and through each of the two wings 2 and 3. The spar 4 is formed preferably of a girder type having an upper beam A of box type and a lower beam B of box type. Each of these box type beams A and B are preferably formed of steel but may be formed of duralumin or beryllium or any strong metal which has also a considerable degree of heat resistance. The spar 5 is also formed as a box type beam of steel or other metal.

The beams A and B of the spar 4 at their portions near the fuselage wherein the generation units are formed are connected by vertical steel or other metal tubes 6 which are of such size that they have considerable strength and therefore strengthen the girder type spar 4 but so that they also form conduits of considerable size passing vertically between the beams A and B of the spar 4 whereby they permit ready flow from the interior of either beam A or B to the other.

The space longitudinally of the wings is divided into so-called generation sections by means of vertical partition walls 7 which may be formed of asbestos fabric or of other fire resistant material which is light in weight. Asbestos fabric is preferably used because it may be strong and light but any other thin resistant material may be used, and in some cases or constructions these partitions may be omitted altogether. Each generation section has several tiers of generation tubes 8. Each tier 8 has its tubes welded at their forward ends into the related tube 6 or into the beam A or B. The tubes 8 of each tier at their rear ends are welded into vertical short tubes 9 and the latter each has at or near its lower end a connection 10 by which it forms rigid connection with the spar 5 and by which also a conduit between the tube 10 and a tube within the interior of the spar 5 is formed. At the upper end of the tubes 9 there are connections 11 by which the upper end of the short tubes 9 are each individually connected rigidly to the spar 5, although they need not be conduits.

Figure 5:
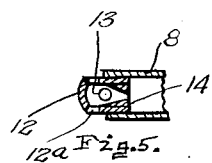
Figure 5 is a section through one of the non-return valves 12.

Each tube 8 of each tier therefore has individual communication at its forward end with the interior of the beams A and B but this communication is through or by non-return valves diagrammatically shown as parts 12 in the principal Figure 1. Each of these non-return valves 12 is constructed as shown in Figure 5 and has a ball 13 constituting the non-return valve and cage 14 which is screwed into the end of the tube 8. Thus each tube 8 may freely deliver into the beams A and B of spar 4 but there may be no return flow from spar 4 into tubes 8. Each short tube 9 by its connection 10 is connected with the connection 10 of one other generation tier of tubes 8 with one water supply conduit 15. That is each water supply conduit 15 supplies two tiers of generation tubes 8.

The water supply conduits 15 are supplied with water under pressure by a distributor 16 and a distributor 17, each of which supplies some of them. The distributors have rotating valves 18 and 19 respectively which are rotated by a shaft 20 and worm wheel 21 and worm 22 by motor 23. The motor 23 is energized by a battery 24 whenever switch 25 is closed by the operator. The valves 18 and 19 have their ports of which one only is shown in each valve, 26 and 27, so located that delivery is permitted to the conduits 15 supplied by each distributor in rotation periodically, so that the delivery from either distributor is at any moment only to one of the conduits 15 related. Preferably the conduits of each distributor receive at alternate periods. The distributors are supplied by a pump 28 which is operated by motor 23.

Each generation section immediately in front of spar 4 has a combustion chamber 29 which is formed in the leading edge 30 of the wing on one side and the leading edge 31 of the wing on the other side. At the front end of each combustion chamber 29 a nozzle 32 formed in the leading edge delivers into the combustion chamber. The nozzles 32 all are open at their front ends so that they may receive air from the atmosphere as the leading edge enters the air in forward movement of the aeroplane. Each nozzle 32 has near its rear end a fuel nozzle 33 by which fuel is sprayed into the nozzle for mixture with the air passing through to combustion chamber 29. Each nozzle 32 is supplied by an individual conduit 34 by means of pump 35 operated by motor 36 and battery 37 as controlled by switch 38, the pump drawing liquid fuel from a reservoir 39. Each conduit 34 may be closed by a hand valve 40. The nozzles are normally all acting except in case one generation unit must be caused to cease functioning on account of some disability. The nozzles as a unit will spray fuel whenever the pump delivers fuel.

A hand valve 41 on one side or wing and 42 on the other side permits closing of the nozzles by the operator, whenever the fuel delivery is caused to cease. Each combustion chamber 29 has an ignition means 43 which may be either a spark plug or incandescent wire and this is caused to function by any battery and other means as a coil and interrupter. Each nozzle 32 has capable of delivering into it as an injector a tube 44 each of which may receive air from main air conduits 45, 46 which are supplied by blower 47 driven by motor 48 when switch 49 is closed. Each of the supply devices is shown with separate drive and battery and switch for simplicity in the illustration it being contemplated that the operator will control them according to gauges as ordinarily used in generation means, this not being shown. Any other means of control, as automatic means, may be used.

The spars 4, 5 have attached to their lower sides an outer metal surface 51. On their upper sides they have inner fire resistant surface 52, a metal surface 53 and a metal surface 54 above an intervening space 55. The intervening space 55 acts as a condenser and receives steam from an exhaust conduit constituted by the interior of the spar 5, the spar 5 receiving exhaust steam from the power turbines 56 by conduits 57. The space 55 delivers condensed steam to space 58 in rear ends of the wings where by tube 59 the condensed water is drawn back to pump 28. The power turbines 56 are fixed on the front upper sides of the wings and drive propellers 60 and receive steam by conduits 61 from spar 4 as controlled by valves 62. It is to be noted that some of the devices are placed as they are for simplicity in illustration and might be otherwise placed in construction. The generation sections have delivery of their combustion gases to atmosphere by means of ports 63 in the under sides of the wings near the rear portions.

In the use of my invention the reservoir 39 is provided with fuel and the water pump 28 draws water provided in its water reservoir. The operator or pilot in preparing for flight starts the motor 36 which controls the fuel supply to fuel nozzles 33, and starts also the motor 48 which drives the blower 47 to supply air under low pressure to injector tubes 44. He at or near the same time starts the motor 23 which operates the water pump 28. The passing of air to injector tubes 44 and the ejection of the air into the neck of the nozzles 32, each of which thus receives its separate supply of air, injector air will cause air from the atmosphere to be drawn into the individual mouths of the nozzles 32 and the air thus passing through the individual nozzles 32 in individual streams will have sprayed into it from the individually related fuel nozzles 33, the fuel pumped under pressure by pump 35. Thus a mixture of air and fuel is continuously formed in each nozzle 32 and injected to its related combustion chamber 29 where the mixture is ignited by the related ignition means 43. Thus combustion in each combustion chamber 29 is effected and continued and the hot gases of combustion pass rearwardly from the individual combustion chambers 29 between the tubes 6 in the space related between beams A and B of spar 4 to the connected space between the adjacent partition walls 7 where the hot gases will heat the generator tubes 8 of that individual space. As the combustion gases flow rearwardly in the spaces between the partition walls 7 the water distributed by the distributors 16 and 17, successively to each of the sets of generating tubes served by the individual water supply conduits 15, will pass forwardly divided between the tubes 8 of each such set of generation tubes. As the water passes forwardly in each tube 8 it is progressively more greatly heated by the rearwardly flowing hot gases about the tubes and thus is converted to steam under high pressure and heat and thus passes by the non-return check valve 13 into the beam A or B, or by way of a tube 6 into beam A or B. Thus beams A and B of spar 4 are supplied with steam under high pressure and heat and when this condition is created the pilot may by valves 62 permit delivery of the steam to power turbines 56, whereupon the propellers 60 will be driven and cause forward movement and flight of the aeroplane. When flight is thus instituted the pilot or engineer may stop the motor 48 and thereby stop the supply of injector air by blower 47 to nozzles 32, the nozzles 32 then receiving a sufficient current of air directed into them for the continuation of combustion and fuel admixture, by the forward movement of the aeroplane through the air whereby air is gathered in the nozzles 32 as it is encountered. Combustion is thus maintained without the blower 47 except in starting and when extraordinary power is required. The engineer may control the fuel supply by motor 36 or by valve 40 according to the pressure and temperature gauges (not shown) according to the degree of heat and pressure. He may likewise control the water supply by motor 23. As steam passes through the turbines 56 they exhaust by way of conduits 57 to interior of spar 5 thence by ports 64 to space 55 under the metal surface 54 which is the upper surface of the wing. The outside passing air continuously cools metal surfaces 54 and thus condenses steam to water in space 55 and the water is drawn by pump 28. The space 55 may in part constitute a water reservoir also. While no automatic control is shown for the sake of simplicity, it is contemplated this may be provided in any of the forms which are commonly known and used for the control of steam generators. The above described the normal operation.

In operation the water pump delivers water in rotation to the generation sections, their tubes 8 and the steam formed in each section passes by the non-return valves to the beams A and B and thence to power turbines and from the latter to the condenser spaces by means of spar 5 which has ports 64 and thence as water back to pump 28. In case any generation section is disabled its water and fuel delivery may be closed by the valves provided and it is contemplated that a mechanic may by any means stop up the air entrance to the related air nozzle. Thus any generation section may be put out of commission and the rest still function. The air for combustion enters the nozzles and thence passes sprayed with fuel to the combustion chambers 29 and thence again out to atmosphere by ports 63.

While I have shown particular devices and combinations of devices in the illustration of my invention I contemplate that other detailed devices and combinations of devices may be utilized in the realization of my invention without departing from the spirit and intent thereof.

What I claim is:

1. In an aeroplane, a wing having spars, generating tubes extending between the spars, and means for heating one surface of the tubes and vaporizing a liquid on the other sides of the tubes.

2. In an aeroplane, a wing having spars, generating tubes extending between the spars and disposed to contribute to the strength of the wings, and means for heating one surface of the tubes and vaporizing a liquid on the other sides of the tubes.

3. In an aeroplane, a wing having disposed within it generating surfaces, and means for heating one side of the generating surfaces and vaporizing a liquid on the other sides of the generating surfaces.

4. In an aeroplane, a wing having disposed within it generating surfaces, air inspirating nozzles in the leading edge of the wings adapted to receive air from the atmosphere and deliver the air to a combustion chamber, means for combusting fuel with the air in the combustion chamber and delivering the combusting gases to one side of the generating surfaces, and means for vaporizing a liquid on the other sides of the surfaces.

5. In an aeroplane, a wing having disposed within it generating surfaces, and means for heating one side of the generating surfaces and vaporizing a liquid on the other side of the generating surfaces, and a motor means receiving gaseous fluid from the generating surfaces and driving a propeller.

6. In an aeroplane, a wing having disposed within it generating surfaces, and air inspirating nozzles in the leading edge of the wing adapted to receive air from the atmosphere and deliver the air to a combustion chamber, means for combusting fuel with the air in the combustion chamber and delivering the combusting gases to one side of the generating surfaces, and means for vaporizing a liquid on the other side of the surfaces and delivering the vaporized gaseous fluid to a motor driving a propeller.

7. In an aeroplane, a wing having hollow spars contributing to its strength, generating tubes delivering to the hollow spars and receiving a liquid from a pressure supplying means, means whereby the hollow spars deliver to a motor means driving a propeller.

8. In an aeroplane, a wing having a hollow spar, generating tubes delivering to the hollow spar and receiving a liquid from a pressure supplying means, means whereby the hollow spar delivers to a motor driving a propeller, and means receiving vapor from the motor and condensing the same for redelivery to the pressure supplying means and means supplying fuel and air for combustion for the heating of the generating tubes.

9. In an aeroplane, a fuselage, a hollow spar extending to one side and a hollow spar extending to the other side, a supplementary spar related to each hollow spar, generator tubes extending from each hollow spar to the related spar and forming a generator surface, means supplying liquid to the generator surfaces, means delivering from the hollow spars to a motor means driving a propeller means, and means for heating the tubes.

10. In an aeroplane, a fuselage, a hollow spar extending to one side and a hollow spar extending to the other side, a supplementary spar related to each hollow spar, generator tubes extending from each hollow spar to the related spar and forming a generator surface, means supplying liquid to the generator surfaces, means delivering from the hollow spars to a motor means driving a propeller means, inspiration means in the leading edge of wing surfaces formed on the spars receiving air from the atmosphere and delivering to combustion chambers, and means for combusting fuel with the air.

11. In an aeroplane, a hollow spar extending to one side and a hollow spar extending to the other side, a supplementary spar related to each hollow spar; airfoil surfaces supported by the spars, generator tubes extending from each hollow spar to the related spar and forming a generator surface, means supplying liquid to the generator surfaces in rotation, means delivering from the hollow spars to a motor means driving a propeller means, inspiration means in the leading edge of wing surfaces formed on the spars receiving air from the atmosphere and delivering to combustion chambers, and means for combusting fuel with the air.

12. In a power plant adapted to aeroplanes, steam generators formed in the wing, condenser surfaces formed in the wing, and power devices adapted to receive gaseous fluid from the generators and deliver to the condenser surface.

13. An aeroplane power plant comprising generating tubes disposed in the wings and heating means passing combusting gases through the spaces containing the tubes.

14. An aeroplane power plant comprising generating tubes forming an inherent part of the wing structure, means supplying liquid to the generating tubes and means supplying air and combustible fuel to the spaces containing the tubes.

15. In an aeroplane, a plurality of spars, airfoil surfaces supported by the spars, generator tubes supported between the spars, means for supplying fuel and air for combustion to heat one side of the generator tube walls, means for vaporizing a liquid on the other side of the generator tube walls, and means utilizing the vaporized liquid to drive a propeller.

16. In an aeroplane, a plurality of spars, airfoil surfaces supported by the spars, generator tubes supported by the spars within the airfoil surfaces, means for supplying fuel and air for combustion to heat one side of the generator tube walls, means for vaporizing a liquid on the other side of the generator tube walls, and means utilizing the vaporized liquid to drive a propeller.

17. In an aeroplane, a plurality of spars, airfoil surfaces supported by the spars, generator tubes supported by the spars within the airfoil surfaces, means for supplying fuel and air for combustion to heat one side of the generator tube walls, means for vaporizing a liquid on the other side of the generator tube walls, motor means utilizing the vaporized liquid to drive a propellor, and condenser means in the spar and airfoil structure for condensing fluid exhausted from the motor means.

18. In an aeroplane, a plurality of spars and airfoil surfaces supported by the spars, a plurality of generator sections supported within the airfoil surfaces, means for supplying of the generator sections with air and fuel and motor means for utilizing the vaporized liquid to drive a propeller.

19. In an aeroplane, a wing structure having disposed therein a generating structure having a combustion chamber, an air gathering means directed forwardly in the aeroplane and adapted to gather air and deliver the air to the combustion chamber, a fuel supply adapted to continuously supply fuel to the combustion chamber, a liquid supply adapted to supply liquid to generating surfaces in the generator structure, and a motor means adapted to utilize vaporized liquid from the generating surfaces to drive a propeller.

In witness whereof, I have hereunto set my hand, this 15th day of October, 1928.

ADOLPHE C. PETERSON.